US007183732B2

(12) United States Patent
Murray

(10) Patent No.: US 7,183,732 B2
(45) Date of Patent: Feb. 27, 2007

(54) MOTORIZED BARRIER OPERATOR SYSTEM FOR CONTROLLING A STOPPED, PARTIALLY OPEN BARRIER AND RELATED METHODS

(75) Inventor: James S. Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 10/829,860

(22) Filed: Apr. 22, 2004

(65) Prior Publication Data

US 2005/0237014 A1 Oct. 27, 2005

(51) Int. Cl.
*H02P 1/00* (2006.01)

(52) U.S. Cl. ...................... 318/280; 318/283; 318/286; 318/466; 318/443; 49/26; 49/28

(58) Field of Classification Search ........ 318/280–283, 318/286, 466–468, 443, 445, 266; 49/26, 49/28
See application file for complete search history.

(56) References Cited

U.S. PATENT DOCUMENTS

| | | | | |
|---|---|---|---|---|
| 3,539,894 | A | 11/1970 | Feldman | 318/463 |
| 4,102,382 | A * | 7/1978 | Vesbach | 160/188 |
| 4,263,536 | A * | 4/1981 | Lee et al. | 318/266 |
| 4,344,252 | A * | 8/1982 | Suzuki et al. | 49/199 |
| 4,408,146 | A | 10/1983 | Beckerman | 318/474 |
| 4,491,774 | A | 1/1985 | Schmitz | 318/285 |
| 4,563,625 | A * | 1/1986 | Kornbrekke et al. | 318/603 |
| 4,922,168 | A * | 5/1990 | Waggamon et al. | 318/286 |
| 5,218,282 | A * | 6/1993 | Duhame | 318/603 |
| 5,625,980 | A | 5/1997 | Teich et al. | 49/26 |
| 5,841,253 | A | 11/1998 | Fitzgibbon et al. | 318/280 |
| 5,969,637 | A | 10/1999 | Doppelt et al. | 340/825.69 |
| 5,998,950 | A | 12/1999 | Fitzgibbon et al. | 318/280 |
| 6,239,569 | B1 | 5/2001 | Fitzgibbon et al. | 318/480 |
| 6,326,751 | B1 | 12/2001 | Mullet et al. | 318/434 |
| 6,833,681 | B2 * | 12/2004 | Fitzgibbon | 318/286 |
| 2003/0154656 | A1 | 8/2003 | Fitzgibbon et al. | 49/26 |

FOREIGN PATENT DOCUMENTS

| | | |
|---|---|---|
| WO | WO 95/08858 | 3/1995 |

* cited by examiner

*Primary Examiner*—Rina Duda
(74) *Attorney, Agent, or Firm*—Renner Kenner Greive Bobak Taylor & Weber

(57) ABSTRACT

A motorized barrier operator that moves a barrier between limit positions, includes a motor for moving the barrier between set limit positions. When the barrier is in a stopped, partially open position the operator implements at least a hybrid control sequence that employs either a four-phase logic or an open-only logic depending upon the status of a mode indicator. In the preferred embodiment the mode indicator is a time light that is activated upon receipt of a user command.

38 Claims, 3 Drawing Sheets

MOTORIZED BARRIER OPERATOR SYSTEM FOR CONTROLLING A STOPPED, PARTIALLY OPEN BARRIER AND RELATED METHODS

TECHNICAL FIELD

Generally, the present invention relates to a movable barrier operator system for use on a closure member moveable relative to a fixed member. More particularly, the present invention relates to an operator-controlled motor for controlling the operation of a closure member, such as a gate or door, between a closed position and an open position. More specifically, the present invention relates to a barrier operator, wherein the operator initiates predetermined operational procedures if the barrier is in a position other than pre-determined position limits.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired or wireless wall station or other similar device. It is also known to provide safety devices that are connected to the operator for the purpose of detecting an obstruction so that the operator may then take corrective action with the motor to avoid entrapment of the obstruction.

How safety devices are used with a door operator system have evolved from the days of no uniform standard to the currently applied government regulations as embodied in Underwriters Laboratories Standard 325. UL Standard 325 encompasses safety standards for a variety of movable barriers such as gates, draperies, louvers, windows and doors. The standard specifically covers vehicular gate or door operators intended for use with garages and/or parking areas. Such devices require a primary safety system and a secondary safety system which are independent of each other. Primary entrapment systems sense the operator motor's current draw, or motor speed and take the appropriate corrective action if the monitored value is exceeded. Primary systems must be internal within the operator head. Secondary entrapment systems are typically external from the operator head and may include a non-contact or contact type sensor. But, secondary systems may also be internal to the operator head as long as they are independent of the primary system.

One of the more widely used non-contact safety devices is a photo-electric eye which projects a light beam across the door's travel path. If the light beam is interrupted during closure of the door, the operator stops and reverses the travel of the door. Contact type safety devices such as an edge-sensitive pressure switch, which is attached to the bottom edge of the door and runs the complete width of the door, may also be used. Other contact safety devices directly monitor the operating characteristics of the driving motor to determine whether an obstruction is present. Typically, shaft speed of the motor is monitored by projecting an infrared light through an interrupter wheel. Alternatively, Hall effect switches or tachometers can be used to monitor shaft speed. Or, the motor current can be monitored such that when an excessive amount of current is drawn by the motor—which indicates that the motor is working harder than normal—it is presumed that an obstruction has been encountered. It is also known to monitor door speed with a sliding potentiometer, wherein a rate of door position change is equated to the speed of the door and wherein unexpected slowing of the door triggers corrective action by the operator. The secondary entrapment requirement may also be met by providing an operator that is capable of receiving continuous pressure on an actuating device that is in the line of sight of the door and maintains the opening or closing motion until the respective limit position is reached. Regardless of how the safety devices work, their purpose is to ensure that individuals, especially children, are not entrapped by a closing door. Opening forces of the door are also monitored to preclude damage to the operating system for instances where an object or individual is caught upon a door panel as the door moves upwardly.

Safety devices perform their function within the operator's direction control logic sequence where each operational signal sent to the motor controls initiates a different movement of the barrier. For example, if a barrier door is fully-closed, the next user command causes the door to open. If the barrier is fully open, the next user command causes the barrier to close. If the barrier is stopped, partially open, that is, between the fully-open and the fully-closed, then the barrier operator typically uses either one, but not both, of the following controlling logic sequences:

a) Four-Phase Logic: The barrier's next direction is opposite of its last direction. If the barrier's last direction was opening, then the next direction will be closing. If the barrier's last direction was closing, the barrier's next direction will be opening. That is, each user command to the barrier operator steps the barrier's movement through four-phases: Open-Stop-Close-Stop-Open- . . .
b) Open Only Logic: A stopped, partially open barrier can only be commanded to open. Only when the barrier is fully open, can a user command the barrier to close.

Although the operational logic remains the same, there are also motors that have separate directional windings where the first winding moves the door in the first direction and a second winding moves the door in the opposite direction. One exemplary device is shown in U.S. Pat. No. 5,841,253 to Fitzgibbon, et al. The '253 patent discloses a garage door opening and closing apparatus having improved operational safety features. The apparatus includes a control circuit which responds to a number of input stimuli to generate commands to open and close a garage door as well as to stop garage door movement. Three relays respond to the commands via drive circuitry to actually connect door operating voltages to the windings of a door controlling motor. By redundancies in the operation of the three relays, faults in the operation of those relays result in safe door operating conditions. Additionally, the control circuitry upon issuing a door stop command performs a test to determine whether or not the door is still moving. If the door is still moving, door up commands are generated by the control circuitry to place the door in a safe position.

There is also prior art that shows methods of controlling the garage lights from signals emitted from the garage door operator as shown and described in U.S. Pat. No. 5,969,637 Doppelt, et al. The '637 patent discloses a garage door operator with a light control that includes a garage door movement apparatus for moving the garage door in an open and in a close direction within a doorway, a light having an on and an off state, a controller for generating a door movement signal for operating the door movement apparatus and for generating a light enable signal for operating the light in one of a plurality of on and off states, and an obstacle detector for detecting the presence of an obstruction in the doorway. The controller responds to the door state (traveling open, traveling closed and stopped open) in order to control operation of the door and activation of the lights. When the door state indicates the door is stopped open and the obstacle detector detects an obstruction in the doorway, the controller generates a light enable signal for enabling the light. In one embodiment of the invention, the remote actuator (transmitter) of the garage door opener includes a garage door control and a light control. A receiver of the garage door opener responds to a first signal transmitted from the remote actuator in response to activation of the garage door control by opening and closing the door, wherein both operations including turning the light on for a predetermined period. The receiver of the garage door opener additionally responds to a second signal from the remote actuator in response to activating the light control and will turn the lights on without moving the door. Such operation advantageously allows the user to remotely turn the garage lights on from the garage door remote actuator without moving the door. Whenever the user has the garage door remote actuator, he or she can turn the light on or off without operating the garage door opening/closing mechanism.

As noted previously, modern garage door openers likely include a safety arrangement consisting of a light beam directed across the doorway and the opener permits door movement only when no obstructions in the doorway are sensed by the beam. Should the light beam be broken by an obstruction, such as a person, the door will not be permitted to close until the obstruction is removed and the light beam circuit is completed. The '637 patent also discloses that upon sensing that the light beam has been broken, a check is made to determine if the door is stationary and open. If such is the case and the lights are off, the lights of the garage door are turned on. If the door is stationary and open and the lights are on, a momentary turn-off of the lights is enabled. The first situation above turns the lights on whenever a person walks or drives into an open garage in which the lights are off. This provides a safety advantage. The second situation of momentary blinking of the lights notifies persons in the garage when someone has entered the garage.

U.S. Pat. No. 4,491,774 to Schmitz discloses a door operator control system for use in conjunction with a motor driven door operator and light system. The control system includes a first control relay having at least first and second sets of contacts, a second control relay having at least first and second sets of contacts, and interconnection means for interconnecting the contacts and the motor whereby the motor operates in one direction upon actuation of the first relay, and the motor operates in the other direction upon actuation of the second relay, and only the light operates upon actuation of both relays.

In the prior art, garage door operators can create unanticipated hazards using “four-phase logic” and can be less of a hazard but a nuisance using “open only logic.” To give an example, if a user partially opens their garage door from the fully closed position to a height to allow venting of the garage or egress of a pet and the pet becomes lodged or wedged in the opening, then the user's first reaction may be to activate the door to open freeing the trapped animal. If the operator utilizes “four-phase logic,” the next movement of the door would be in the closing direction, thus increasing the force on the trapped animal. If the operator used “open only logic,” the door would go up to its fully open position and the animal would be freed. However, stopped, partially opened doors controlled by operators with “open only logic” will always go up when activated and must reach the upper fully-open travel limit before it can go down again. Therefore in the evening when the user wants to close the door, the door must travel to its fully-open upper limit, stop, and receive another signal to send it to the closed position.

Garage door operators should undergo a monthly obstruction reversal test where the door is closed on a 2" by 4" block of wood and the door must reverse when it hits the obstruction. If the door doesn't reverse, the user is required to reduce the down force by making an adjustment to the force settings or change the full-close limit position and continue to test and adjust until the door reverses. With an “open only logic,” the door always returns to the full-open position before another adjustment is made. Accordingly, making the adjustment for obstruction detection of operators with this type of control logic time is quite time consuming. This is normally considered to be an unacceptable nuisance. Further, if the number of door opening and closing cycles necessary to establish the force settings is excessive, the motor will heat up and the motor's thermal protector will open. This action shuts the motor down for a period of time preventing further door movements until the motor cools down which also results in an unacceptable nuisance.

Normally, as the door is traveling in a downward direction and the door movement is blocked by an obstruction, the door will stop and reverse to the fully open position. During the reversal period, it is common to restrict further door movement commands for a period of time or distance to ensure the door will properly be removed off the object that caused the reversal. Indeed, typical residential garage door operators, upon detecting an obstruction of a downward moving door, stop the door's travel, pause for a short time (0.1 s to 1.0 s typical), and then the door begins upward travel to the full-open position. During this stop-pause-upward sequence, a user may command the door using a remote control or a wired control. A user door command during the stop-pause-upward sequence could stop the door completely, not allowing the sequence to complete. Such a device is disclosed in U.S. Pat. No. 6,239,569. And published patent application US 2003/0154656 A1 discloses a system which inhibits user commands during the stop-pause-upward sequence.

In summary, the prior art logic systems—four phase or open only—work well, but each has a disadvantage. The open only logic system, which causes the barrier to move in an open direction from all stopped positions except the full-open limit position, is considered to be the safest logic system, but it can be inconvenient to the user. This inconvenience results from waiting for the door or barrier to first move to a full-open limit position before moving in a closing direction. The four-phase logic system is easier to use in that a full-open limit position does not need to be obtained in order to move the barrier in a closing direction. But, the four-phase logic can be problematic in situations where an object may be entrapped. Therefore, there is a need in the art for an operator system that provides the safety and convenience benefits of both logic systems while minimizing their disadvantages.

DISCLOSURE OF INVENTION

One of the aspects of the present invention is to provide a method for controlling a stopped, partially open barrier comprising a motorized barrier operator that moves a barrier between limit positions; and utilizing a changeable operating sequence when the barrier is stopped at a position other than the limit positions.

Another aspect of the present invention contemplates a motorized barrier operator that moves a barrier between set limit positions and which comprises a motor for moving the barrier between limit positions; an operator for controlling operation of the motor; and a selection switch associated with the operator, wherein the selection switch enables at least two operating sequences.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
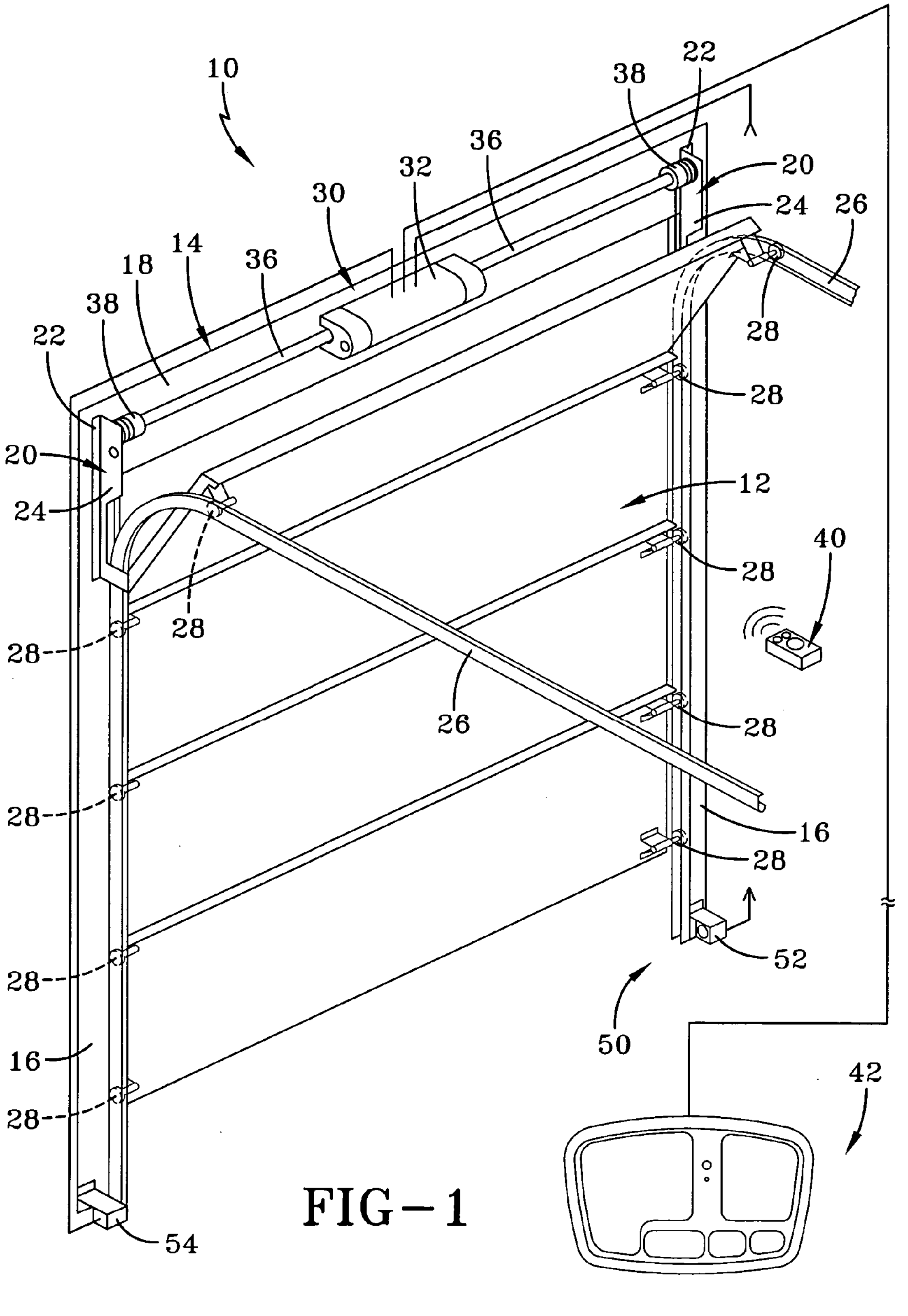
FIG. 1 is a fragmentary perspective view depicting a sectional garage door and showing an operating mechanism embodying the concepts of the present invention.

A motorized barrier operator adaptable to different safety configurations is generally indicated by the numeral 10 in FIG. 1 of the drawings. The system 10 is employed in conjunction with a conventional sectional garage barrier or door generally indicated by the numeral 12. The teachings of the present invention are equally applicable to other types of movable barriers such as single panel doors, gates, windows, retractable overhangs, and any device that at least partially encloses an area. The opening in which the door is positioned for opening and closing movements relative thereto is surrounded by a frame, generally indicated by the numeral 14, which consists of a pair of a vertical spaced jamb members 16 that, as seen in FIG. 1, are generally parallel and extend vertically upwardly from the ground (not shown). The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
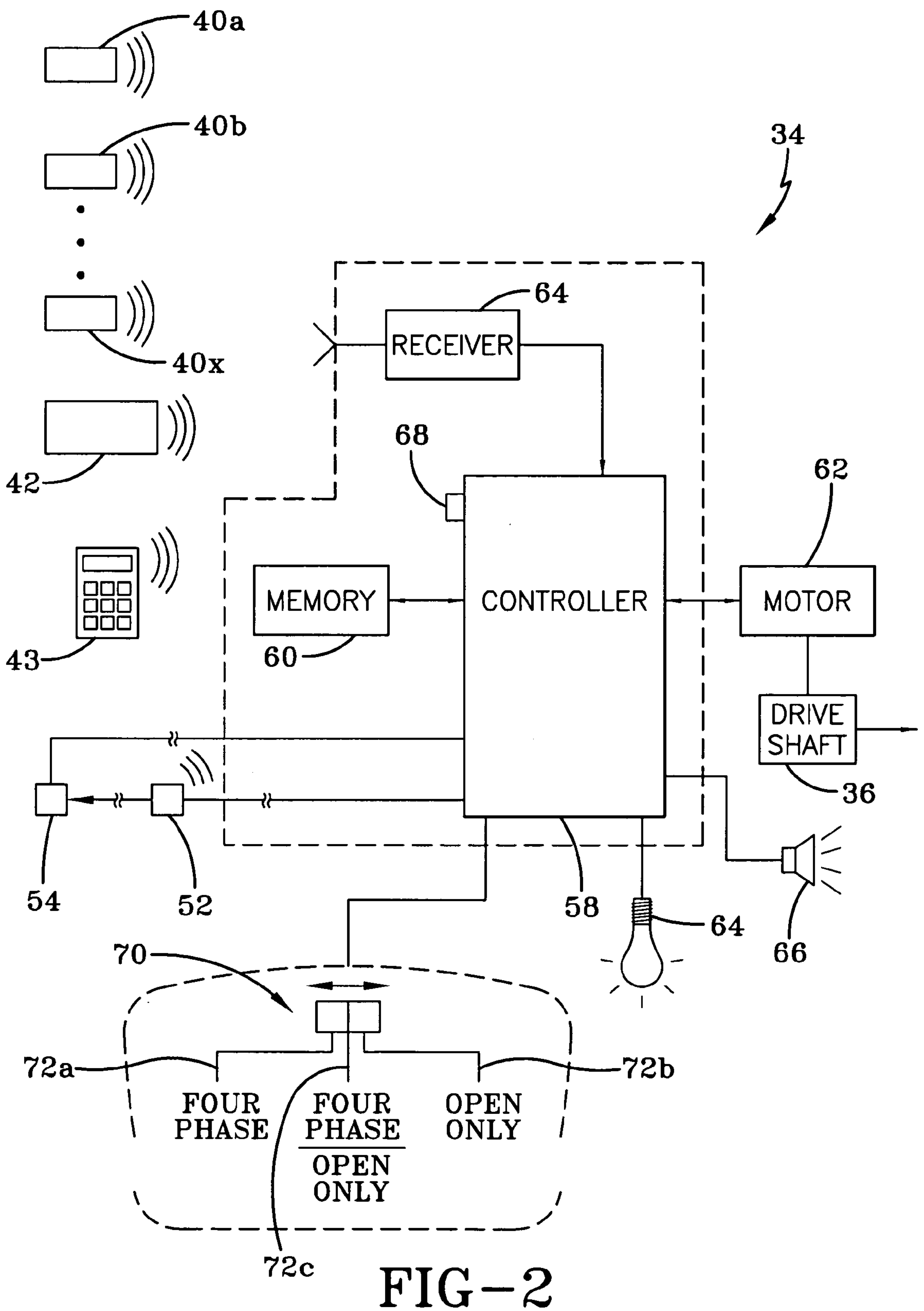
FIG. 2 is a schematic diagram of an operator mechanism.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. This includes, but is not limited to, trolley, jackshaft, screw-type or other header-mounted operators.

In order to move the door from an open position to a closed position or vice versa, a remote transmitter 40, a wall station transmitter 42 or a keyless entry pad 43 may be actuated. The remote transmitter 40 may use infrared, acoustic or radio frequency signals that are received by the operator mechanism to initiate movement of the door. Likewise, the wall station 42 may perform the same functions as the remote transmitter 40 and also provide additional functions such as the illumination of lights and provide other programming functions to control the manner in which the barrier is controlled. The wall station 42 or keyless entry pad 43 may either be connected directly to the operator mechanism 34 by a wire or it may employ radio frequency, infrared or acoustic signals to communicate with the operator mechanism 34. The wall station is preferably positioned within the line of sight of the barrier as it moves between positions.

An external secondary entrapment system, which is designated generally by the numeral 50, may be included with the system 10. In the preferred embodiment, the entrapment system 50 is a photoelectric sensor which has a sending device 52 and a receiving device 54. The sending device 52 is mounted to either the jamb 16 or the track 26 near the floor of the door area. The devices 52 and 54 are mounted at about 5 inches above the floor and on the inside of the door opening to minimize any interference by the sun. It will be appreciated that the position of the devices 52 and 54 may be positionably reversed if needed. In any event, the sending device 52 emits a visible, laser or infrared light beam that is detected by the receiver 54 which is connected to the operator mechanism 34. If an object interrupts the light beam during door travel, the receiver relays this information to a controller maintained in the operator mechanism which initiates the appropriate corrective action. In this way, if an object interrupts a light beam during a downward motion of the garage door, the motion of the door is at least stopped and/or returned to the opening position. It will be appreciated that other external secondary entrapment features or systems such as a contact-type safety edge on the bottom panel of the door could be used with the present invention.

Referring now to FIG. 2, it can be seen that the operator mechanism 34 employs a controller 58 which receives power from batteries or some other appropriate power supply. The controller 58 includes the necessary hardware, software, and a memory device 60 to implement operation of the operator 34. It will be appreciated that the memory device 60 may be integrally maintained within the controller 58. When either the remote transmitter 40 or wall station 42 is actuated, a receiver 64 receives the signal and converts it into a form useable by the controller 58. If a valid signal is received by the controller 58, it initiates movement of the motor 62 which, in turn, generates rotatable movement of the drive shaft 36 and the door or barrier is driven in the appropriate direction. The external secondary entrapment system 50, particularly the sending and receiving units 52, 54, are directly connected to the controller 58 to provide appropriate input. The entrapment system may be directly wired to the controller 58. In the alternative, a wireless transceiver could be associated with the receiving and sending units 52/54 for the purpose of communicating with the controller 58.

Other features of the system 10 may include a light 64 and an audio speaker 66 connected to the controller. The light 64 may be toggled on and off by actuation of an appropriate button on the wall station 42 or upon initiation of barrier movement. During normal operation, the light is turned on and a timer is started upon receipt of a user barrier command. Actuation of any barrier user command will re-start the timer. And the status of the light or other mode indicator is detected and stored at the time any user barrier command is detected. The light 64 or the speaker 66 may be used to indicate various programming modes of the controller. Such modes may be entered by pressing, or pressing and releasing a program button 68 that is operatively connected to the controller 58. Entering of a programming mode with the button 68 allows for the controller to enable and/or disable various safety features associated with the system 10. Or the programming mode may be entered by selective actuation of buttons on the wall station 42 or by other known means. The programming mode may be used to set the fully-open and fully-close travel limits. In the context of a garage door, the fully-close limit position is when the door is contacting the floor and the fully-open limit position is when the door in no way blocks ingress or egress from the opening defined by the frame 14. The fully-open and fully-close limit positions are distinguishable from the extreme door travel limit positions which are determined by the barrier and its' supporting structure. In most instances, the fully-close limit position and the extreme-close limit is determined by the floor location and are one in the same. The fully-open limit position is preferably somewhat removed from the extreme-open limit position so as to prevent mechanical stress and fatigue on the barrier and its' supporting structure. The fully-open and fully-close limit positions are preferably set in the programming mode, but they may be set by the user by implementing options available in other set-up routines. The components of the operator mechanism and remote wireless components may be powered by a conventional residential power source and/or by batteries.

A logic mode selection switch 70 is connected to the controller and allows the user to select between three modes of operation for when the barrier is at a position other than the fully-open or fully close limit positions. In other words, the operator implements known logic procedures when the barrier is at the fully-open or fully-closed limit positions. And, the operator, depending upon the position of the selection switch, implements different logic procedures when the barrier is stopped at a position somewhere between, but not at, the fully-open and fully-closed limit positions. A first mode 72*a*, designated as four-phase, causes the barrier's next direction to be opposite that of the previous direction. As described previously, whenever the door or barrier is stopped and partially opened, the operator determines the door's last direction and if it was in the down direction, the barrier will be moved upwardly. But if the door's last direction was up, then the door will be moved downwardly. If the door's last direction is unknown, e.g. the operator was recently powered up, then the door moves in the upward direction. A second mode 72*b*, designated as open-only, causes the door's next direction upon receipt of a user door command to be upwardly. In other words, if the door is in a stopped, partially opened position and a user command is received, the door will always be moved upwardly. As noted previously, this is considered to be the safest response but it is somewhat time consuming when testing for obstruction sensitivity. A third mode 72*c* is designated as "four phase/open only" in the drawings, but is referred to herein as a hybrid mode. This mode adopts the benefits of the four-phase operating sequence and the open only operating sequence. Implementation of the hybrid mode will be discussed as the detailed description proceeds. It will also be appreciated that the modes enabled by the selection switch could be selected by actuating buttons on the wall station in a predetermined sequence or by connecting a jumper to the appropriate terminals on the controller. If desired, the selection switch does not need to be provided and the hybrid mode could be implemented as the default operating sequence implemented by the controller.

Figure 3:
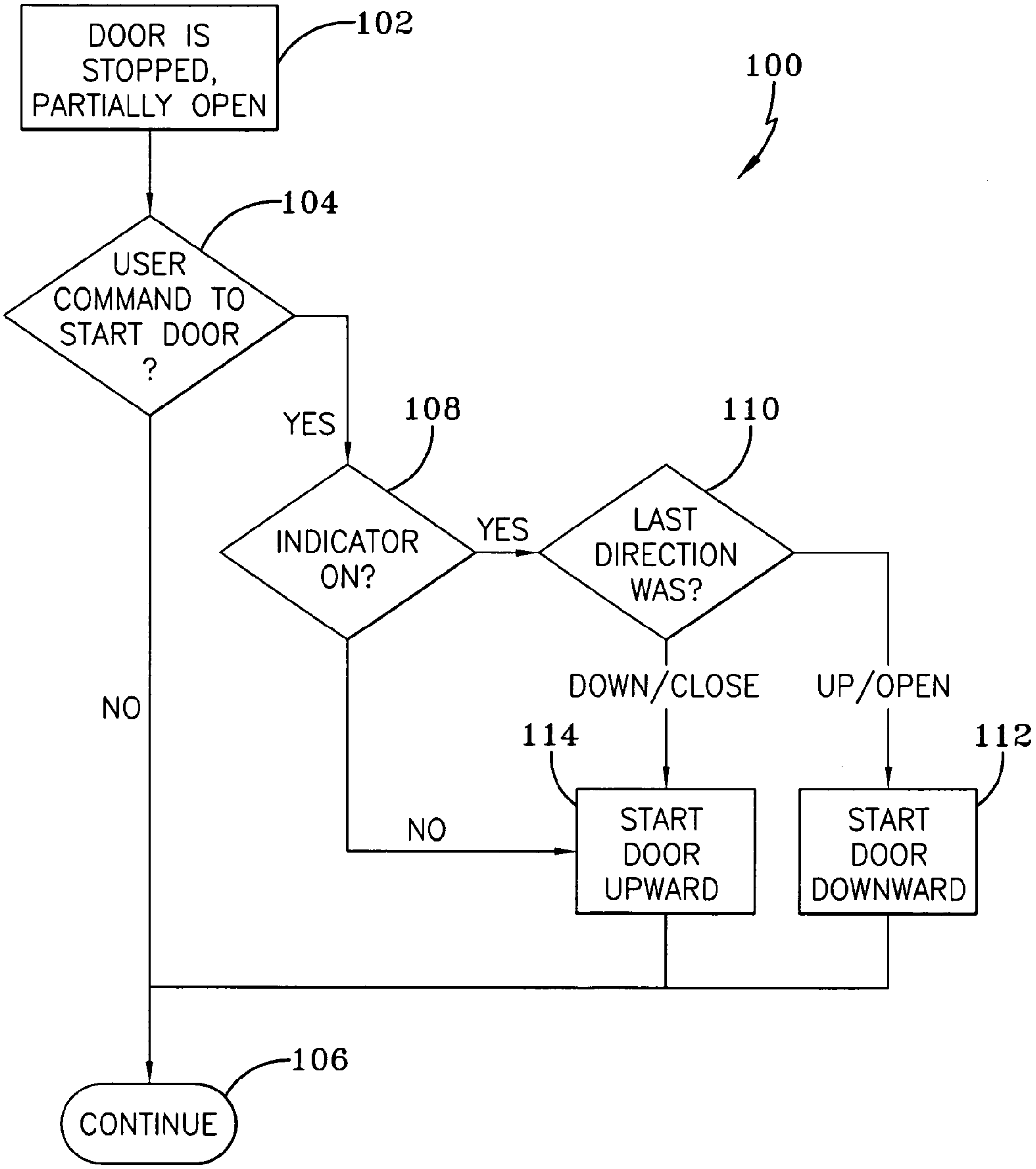
FIG. 3 is an operational flow chart employed by operator of the present invention for controlling a barrier in a stopped partially open position.

Referring now to FIG. 3, it can be seen that an operational flow chart is designated by the numeral 100 for the purpose of controlling a barrier that is in a stopped, partially opened position. It will be appreciated that this procedure is utilized only when the door or barrier is in a position other than at the fully open or fully closed limit positions. And the operational procedure designated by numeral 100 is only implemented when the controller is in the hybrid mode. If the selection switch 70 is in mode 72*a* or 72*b* then the operator implements the corresponding mode as described above. When the barrier or door is at either the fully open or fully closed limit positions normal operating procedures are implemented. Accordingly, the operator at step 102, determines whether the barrier is stopped at a partially open position. If so, then at step 104 the operator awaits a user command to move the door. If no command is received, then the process continues on to step 106 and the operational procedure returns to step 102 at the appropriate time.

If at step 104 a user command is received to move the door, then the process continues to step 108 to determine whether an indicator such as the light 64 or speaker 66 was in an active or on condition immediately before receipt of the user command. If the indicator at step 108 is indicated by being active or on, the process continues to step 110 to determine the last direction of the door. If the barrier's last direction was in the up or open direction, then the barrier or door is moved in the downward or closing direction at step 112. However, if at step 110 the operator determines that the last direction of the barrier was in the down or closing direction, or if for some reason the last direction cannot be conclusively determined, then the barrier is opened or moved upwardly at step 114. Upon completion of steps 112 or 114, the process continues to the continue step 106.

If at step 108 it is determined that the light or other mode indicator is in an inactive or off condition, then the process proceeds directly to step 114 and the door is automatically moved in an upward or opening direction. It will be appreciated that any time a user door command is received that the light or other indicator is turned on for a predetermined period of time. For example, when a door user command is received, the light 64 is turned on for a period of about five minutes to allow for lighting of the enclosure area. This time period may be adjusted between two to ten minutes by a potentiometer connected to the controller, or by a sequence of wall station button actuations or the like. In any event, during this time it is presumed that an active condition is desired and the light remains on. Accordingly, with the light or other indicator on, steps 108, 110, 112 and 114 collectively allow for the four-phase operating mode which facilitates implementation of the obstruction detection testing. However, if the light or other indicator is off immediately prior to the user door command at step 104, then steps 108 and 114 collectively implement the open only operating mode which provides the safest possible operation.

Based upon the foregoing it will be appreciated that the advantages of the present invention are readily apparent. The present invention is advantageous in that it provides for a timed sequence that allows for the use of "four-phase logic" when needed to perform mandatory obstruction tests, thus requiring less time than if "open only logic" controls were in place. When the timed sequence is expired, then the controller reverts to "open only logic." Accordingly, this system prevents the door from closing on the first command to move the door after the timed sequence has expired. The invention is also advantageous in that it utilizes an indicator, such as a light or audible speaker, to notify the user as to the state of the timed sequence. In other words, if the indicator is in an active condition, then the four-phase logic is employed, but if the indicator is in an inactive condition, then the open only logic is employed. It will further be appreciated that the timed sequence—that sequence which allows the user to maintain the light in an on position—may be user adjustable by providing a potentiometer or other timer device directly associated with the controller. It will further be appreciated that the selection switch 70 may be in a form of a jumper or in other programming sequences provided by the operator controller.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for controlling a motorized barrier when the barrier is in a stopped, partially open position, comprising:

providing a motorized barrier operator that moves a barrier between limit positions;

actuating a transmitter to initiate movement of the barrier between limit positions when the barrier is at any position;

moving a selection switch connected to said motorized barrier operator to one of at least two available operating sequences, wherein said operating sequences control a next direction of movement of the barrier upon subsequent actuations of said transmitter, and wherein the next direction of movement is dependent upon the operating sequence selected; and utilizing one of said at least two available operating sequences provided by said moving step when said transmitter is actuated and said barrier is stopped at a position other than said limit positions.

2. The method according to claim 1, further comprising:

checking a mode indicator to enable one of said at least two available operating sequences.

3. The method according to claim 2, further comprising:

designating a four-phase operating sequence based upon said mode indicator.

4. The method according to claim 3, wherein said four-phase operating sequence comprises:

determining a last direction movement of said barrier; and moving said barrier in a direction opposite said last direction only upon receipt of a user barrier command signal from said transmitter.

5. The method according to claim 2, further comprising:

designating an open only operating sequence based upon said mode indicator.

6. The method according to claim 5, wherein said open only operating sequence comprises:

moving said barrier in an opening direction only upon receipt of a user barrier command signal from said transmitter.

7. The method according to claim 2, further comprising:

designating said mode indicator as a light that is operatively connected to said operator; and turning said light on and designating a four-phase operating sequence upon receipt of a user barrier command signal from said transmitter.

8. The method according to claim 7, further comprising:

initiating a timer on implementation of said turning step; and designating an open only sequence upon elapsing of said timer.

9. The method according to claim 8, wherein said four-phase operating sequence comprises:

determining a last direction movement of said barrier; and moving said barrier in a direction opposite said last direction only upon receipt of a user barrier command signal from said transmitter.

10. The method according to claim 8, wherein said open only sequence comprises:

moving said barrier in an opening direction only upon receipt of said user barrier command signal from said transmitter.

11. The method according to claim 1, further comprising:

associating said selection switch with at least two operating sequences, wherein one of said operating sequences is a hybrid sequence.

12. The method according to claim 11, further comprising:

designating said operating sequences as a four-phase sequence, an open only sequence, and said hybrid sequence which implements selected operations of said four-phase sequence and said open only sequence.

13. The method according to claim 11, further comprising:

checking a mode indicator to enable one of at least two available operating sequences.

14. The method according to claim 13, further comprising:

designating a four-phase operating sequence based upon said mode indicator;

determining a last direction movement of said barrier; and moving said barrier in a direction opposites aid last direction only upon receipt of a user barrier command signal from said transmitter.

15. The method according to claim 13, further comprising:

designating an open only operating sequence based upon said mode indicator; and moving said barrier in an opening direction only upon receipt of a user barrier command signal from said transmitter.

16. The method according to claim 13, further comprising:

designating said mode indicator as a light that is operatively connected to said operator;

turning said light on and designating a four-phase operating sequence upon receipt of a user barrier command from said transmitter;

initiating a timer upon implementation of said turning step; and designating an open only sequence upon elapsing of said timer.

17. The method according to claim 16, wherein said four-phase operating sequence comprises:

determining a last direction movement of said barrier; and moving said barrier in a direction opposite said last direction only upon receipt of a user barrier command signal.

18. The method according to claim 16, wherein said open only sequence comprises:

moving said barrier in an opening direction only upon receipt of said user barrier command signal from said transmitter.

19. The method according to claim 1, further comprising:

associating said selection switch with at least two operating sequences, wherein one of said operating sequences is a four-phase sequence.

20. The method according to claim 19, wherein the other of said operating sequences is a hybrid sequence which implements selected operations of said four-phase sequence.

21. The method according to claim 1, further comprising:

associating said selection switch with at least two operating sequences, wherein one of said operating sequences is an open only sequence.

22. The method according to claim 21, wherein the other of said operating sequences is a hybrid sequence which implements selected operations of said open only sequence.

23. The method according to claim 1, wherein said step of moving said selection switch does not initiate movement of the barrier from any position.

24. A motorized barrier operator that moves a barrier between limit positions, comprising:

a motor for moving the barrier between limit positions;

an operator for controlling operation of said motor;

a transmitter associated with said operator that upon actuation moves the barrier between limit positions when the barrier is at any position; and a mode selection switch associated with said operator, said mode selection switch enabling at least two operating sequences when said transmitter is actuated, wherein said operating sequences control the next direction of movement of the barrier upon subsequent actuations of said transmitter, and wherein the next direction of movement is dependent upon the operating sequence selected, and wherein the operating sequences are implemented when the barrier is stopped at a position other than the limit positions.

25. The operator according to claim 24, wherein one of said at least two operating sequences is a hybrid operating sequence that is operative in one of a four-phase mode and an open only mode.

26. The operator according to claim 25, further comprising:

a mode indicator connected to said operator; and at least one transmitter device that sends user command signals to said operator.

27. The operator according to claim 26, wherein said mode indicator is a light controlled by said operator.

28. The operator according to claim 26, wherein said mode indicator is active for a predetermined period of time after receiving one of said user command signals.

29. The operator according to claim 28, wherein if said mode indicator is inactive, said hybrid sequence implements said open only mode, wherein any user command signal received by said operator causes the barrier stopped at a position other than the limit positions to move in an opening direction.

30. The operator according to claim 28, wherein if said mode indicator is active, said hybrid sequence implements said four-phase mode, wherein any user command signal received by said operator causes the barrier stopped at a position other than the limit positions to move in a direction opposite the barrier's last movement direction.

31. The operator according to claim 28, wherein if said mode indicator is inactive, said hybrid sequence implements said open only mode, wherein any user command signal received by said operator causes the barrier stopped at a position other than the limit positions to move in an opening direction, and wherein if said mode indicator is active, said hybrid sequence implements said four-phase mode, wherein any user command signal received by said operator causes the barrier stopped at a position other than the set limit positions to move in a direction opposite the barrier's last movement direction.

32. The operator according to claim 25, wherein the other of said operating sequences is an open only sequence, and wherein any user command signal received by said operator causes the barrier stopped at a position other than the limit positions to move in an opening direction.

33. The operator according to claim 25, wherein the other of said operating sequences is a four-phase sequence, and wherein any user command signal received by said operator causes the barrier stopped at a position other than the limit position in a direction opposite the barrier's last movement direction.

34. The operator according to claim 24, wherein one of said operating sequences is a four-phase sequence that is implemented when the barrier is stopped at a position other than the limit positions.

35. The operator according to claim 34, wherein the said operating sequence is a hybrid sequence which implements selected operations of said four-phase sequence.

36. The operator according to claim 24, wherein one of said operating sequences is an open only sequence that is implemented when the barrier is stopped at a position other than the limit positions.

37. The operator according to claim 36, wherein the other of said operating sequences is a hybrid sequence which implements selected operations of said open only sequences.

38. The operator according to claim 24, wherein moving said mode selection switch does not initiate movement of the barrier from any position.

* * * * *